(12) United States Patent
Nagasaki

(10) Patent No.: US 6,888,890 B2
(45) Date of Patent: May 3, 2005

(54) DEVICE AND METHOD FOR SEARCHING FOR A MOTION VECTOR

(75) Inventor: Mayumi Nagasaki, Tokyo (JP)

(73) Assignee: NEC Corporation, Tokyo (JP)

(*) Notice: Subject to any disclaimer, the term of this patent is extended or adjusted under 35 U.S.C. 154(b) by 752 days.

(21) Appl. No.: 09/818,859

(22) Filed: Mar. 28, 2001

(65) Prior Publication Data
US 2003/0067985 A1 Apr. 10, 2003

(30) Foreign Application Priority Data
Mar. 28, 2000 (JP) ........................................ 2000-092960

(51) Int. Cl.[7] .............................................. H04N 7/18
(52) U.S. Cl. .............................. 375/240.16; 375/240.17
(58) Field of Search ........................ 375/240.16, 240.17

(56) References Cited

U.S. PATENT DOCUMENTS

| | | | | |
|---|---|---|---|---|
| 5,473,379 A | * | 12/1995 | Horne | .................... 375/240.16 |
| 5,883,674 A | | 3/1999 | Ogura | |
| 6,078,618 A | * | 6/2000 | Yokoyama et al. | ......... 375/240 |
| 6,690,729 B2 | * | 2/2004 | Hayashi | ................. 375/240.16 |

FOREIGN PATENT DOCUMENTS

| | | |
|---|---|---|
| EP | 0 831 642 A2 | 3/1998 |
| JP | 5-43681 U | 6/1993 |
| JP | 5-328333 A | 12/1993 |
| JP | 10-98730 A | 4/1998 |
| JP | 10-341440 | 12/1998 |
| JP | 2000-050281 | 2/2000 |

* cited by examiner

*Primary Examiner*—Andy Rao
(74) *Attorney, Agent, or Firm*—Sughrue Mion, PLLC

(57) ABSTRACT

In a motion vector searching device which includes a motion vector searching portion (101–110) supplied with an input picture signal representative of a succession of pictures for dividing each of the pictures of the input picture signal into blocks and for searching for a motion vector as a searched motion vector for each of the blocks of each of the pictures in a search area of the input picture signal for each of the blocks of each of the pictures, a learning portion (113, 313) learns tendencies of the searched motion vectors for previous pictures previous to a current picture of the pictures of the input picture signal to produce tendency information representative of the tendencies. A determining portion (114) determines the search area for each of the blocks of the current picture on the basis of the tendency information to cause the motion vector searching portion to search for the motion vector as the searched motion vector for each of the blocks of the current picture in the search area for each of the blocks of the current picture.

7 Claims, 8 Drawing Sheets

DEVICE AND METHOD FOR SEARCHING FOR A MOTION VECTOR

BACKGROUND OF THE INVENTION

This invention relates to a motion vector searching device and a motion vector searching method typically used in encoding a moving picture to search for a motion vector in an input picture. This invention also relates to a recording medium recording a program for executing the motion vector searching method.

Traditionally, use has been made of moving picture encoding for compressing a data amount of a moving picture by dividing an input moving picture into a plurality of small blocks (macro-blocks, hereinafter abbreviated to MB), searching, for each MB, for a motion vector (hereinafter abbreviated to MV) representative of a movement of an object with respect to a past or a future picture, and removing a temporal redundancy of the moving picture by the use of MV information. Each MB has typically 16×16 picture elements Referring to FIG. 1, a related motion vector searching device will be described.

In FIG. 1, the motion vector searching device comprises a search object MB picture downloading portion 501, a search area MB picture downloading portion 502, a search object MB picture memorizing portion 503, a search area MB picture memorizing portion 504, a search position updating portion 505, an MB distance measuring portion 506, a MV candidate data updating portion 507, a MV candidate data memorizing portion 508, a search end judging portion 509, and a MV calculating portion 510.

Next referring to FIG. 2, an operation of the related motion vector searching device will be described.

The search object MB picture downloading portion 501 is supplied with a search object MB picture and makes the picture be stored in the search object MB picture memorizing portion 503 (step B1).

The search area MB picture downloading portion 502 is supplied from an outside with the information of a MV search area (for example, information representative of a area covering 48×48 picture elements in horizontal and vertical directions) for the search object MB picture, acquires all MB pictures within the MV search area, and makes these pictures be stored in the search area MB picture memorizing portion 404. After completion of this storing operation, the search area MB picture downloading portion 502 delivers a download end signal to the search position updating portion 505 (step B2).

The search position updating portion 505 is supplied with the information of the MV search area and, upon reception of the download end signal or upon reception of a search position updating request signal from the search end judging portion 509, updates a search position within the MV search area, and delivers search position information to the MB distance measuring portion 506 (step B3).

The MB distance measuring portion 506 is supplied with the search object MB picture from the search object MB picture memorizing portion 503 and with a search position MB picture among all the MB pictures stored in the search area MB picture memorizing portion 504. Then, the MB distance measuring portion 506 measures as a measured distance a distance between the search object MB picture and the search position MB picture and delivers the measured distance and the search position information to the MV candidate data updating portion 507 (step B4).

The MV candidate data updating portion 507 is supplied with the information of the minimum distance stored in the MV candidate data memorizing portion 508 and compares the minimum distance with the measured distance supplied from the MB distance measuring portion 506. If the measured distance is smaller than the minimum distance, the measured distance and the search position information are stored in the MV candidate data memorizing portion 508 as a new minimum distance and new search position information corresponding to the new minimum distance. On the other hand, if the measured distance is greater than the minimum distance, the information stored in the MV candidate data memorizing portion 508 is not updated. Thereafter, the MV candidate data updating portion 507 delivers a position search end signal to the search end judging portion 509 (step B5).

In response to the position search end signal, the search end judging portion 509 judges whether or not the search has ended for all search positions within the MV search area supplied from the outside. If the result of judgment indicates that the search for all search positions within the MV search area has not yet ended, the search end judging portion 509 delivers the search position updating request signal to the search position updating portion 505. On the other hand, if the result of judgment indicates that the search for all search positions within the MV search area has ended, the search end judging portion 509 delivers a area search end signal to the MV calculating portion 510 (step B6).

Subsequently, the steps B3, B4, B5, and B6 are repeated until the area search end signal is delivered from the search end judging portion 509 to the MV calculating portion 510.

Supplied from the search end judging portion 509 with the area search end signal, the MV calculating portion 510 acquires the search position information stored in the MV candidate data memorizing portion 508 and outputs the search position information as MV information (step B7).

The related motion vector searching device is disclosed, for example, in Japanese Unexamined Patent Publication (JP-A) No. H10-341440.

However, the above-mentioned motion vector searching device is disadvantageous in the following respects.

As a first problem, it is impossible to restrict the search area in the MV searching operation in moving picture encoding. This is because no operation of learning the tendency of past movement of the picture element is carried out and, therefore, a direction of future movement of the picture element can not be predicted.

As a second problem, the MV searching operation in the moving picture encoding requires an enormously large processing amount. This is because the direction of the movement of the picture element can not be predicted at all and, therefore, the motion vector search must be carried out for all picture elements within the search area.

SUMMARY OF THE INVENTION

It is therefore an object of this invention to considerably reduce a processing amount required in an MV searching operation.

According to an aspect of this invention, there is provided a motion vector searching device which includes a motion vector searching portion supplied with an input picture signal representative of a succession of pictures for dividing each of the pictures of the input picture signal into blocks and for searching for a motion vector as a searched motion vector for each of the blocks of each of the pictures in a search area of the input picture signal for each of the blocks of each of the pictures, the motion vector searching device comprising:

a learning portion for learning tendencies of the searched motion vectors for previous pictures previous to a current picture of the pictures of the input picture signal to produce tendency information representative of the tendencies; and a determining portion for determining the search area for each of the blocks of the current picture on the basis of the tendency information to cause the motion vector searching portion to search for the motion vector as the searched motion vector for each of the blocks of the current picture in the search area for each of the blocks of the current picture.

According to another aspect of this invention, there is provided a motion vector searching method which includes a motion vector searching step, supplied with an input picture signal representative of a succession of pictures, of dividing each of the pictures of the input picture signal into blocks and of searching for a motion vector as a searched motion vector for each of the blocks of each of the pictures in a search area of the input picture signal for each of the blocks of each of the pictures, the motion vector searching method comprising:

a learning step of learning tendencies of the searched motion vectors for previous pictures previous to a current picture of the pictures of the input picture signal to produce tendency information representative of the tendencies; and a determining step of determining the search area for each of the blocks of the current picture on the basis of the tendency information to cause the motion vector searching step to search for the motion vector as the searched motion vector for each of the blocks of the current picture in the search area for each of the blocks of the current picture.

According to still another aspect of this invention, there is provided a recording medium recording a program for executing:

a motion vector searching operation, supplied with an input picture signal representative of a succession of pictures, of dividing each of the pictures of the input picture signal into blocks and of searching for a motion vector as a searched motion vector for each of the blocks of each of the pictures in a search area of the input picture signal for each of the blocks of each of the pictures;

a learning operation of learning tendencies of the searched motion vectors for previous pictures previous to a current picture of the pictures of said input picture signal to produce tendency information representative of said tendencies; and a determining operation of determining the search area for each of the blocks of said current picture on the basis of said tendency information to cause said motion vector searching operation to search for the motion vector as the searched motion vector for each of the blocks of said current picture in the search area for each of the blocks of said current picture.

DESCRIPTION OF THE PREFERRED EMBODIMENTS

Figure 1:
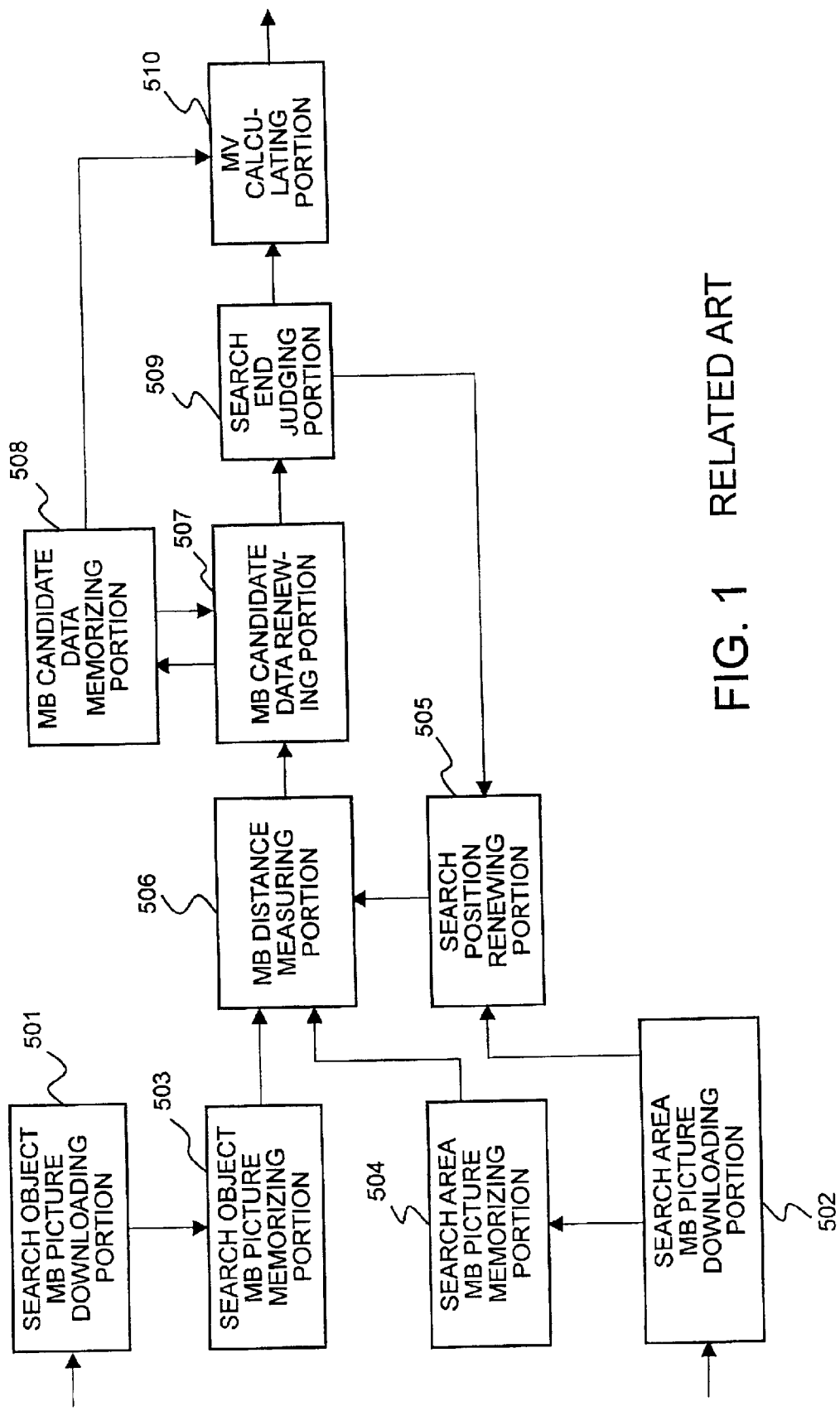
FIG. 1 is a block diagram of a related motion vector searching device.
Figure 2:
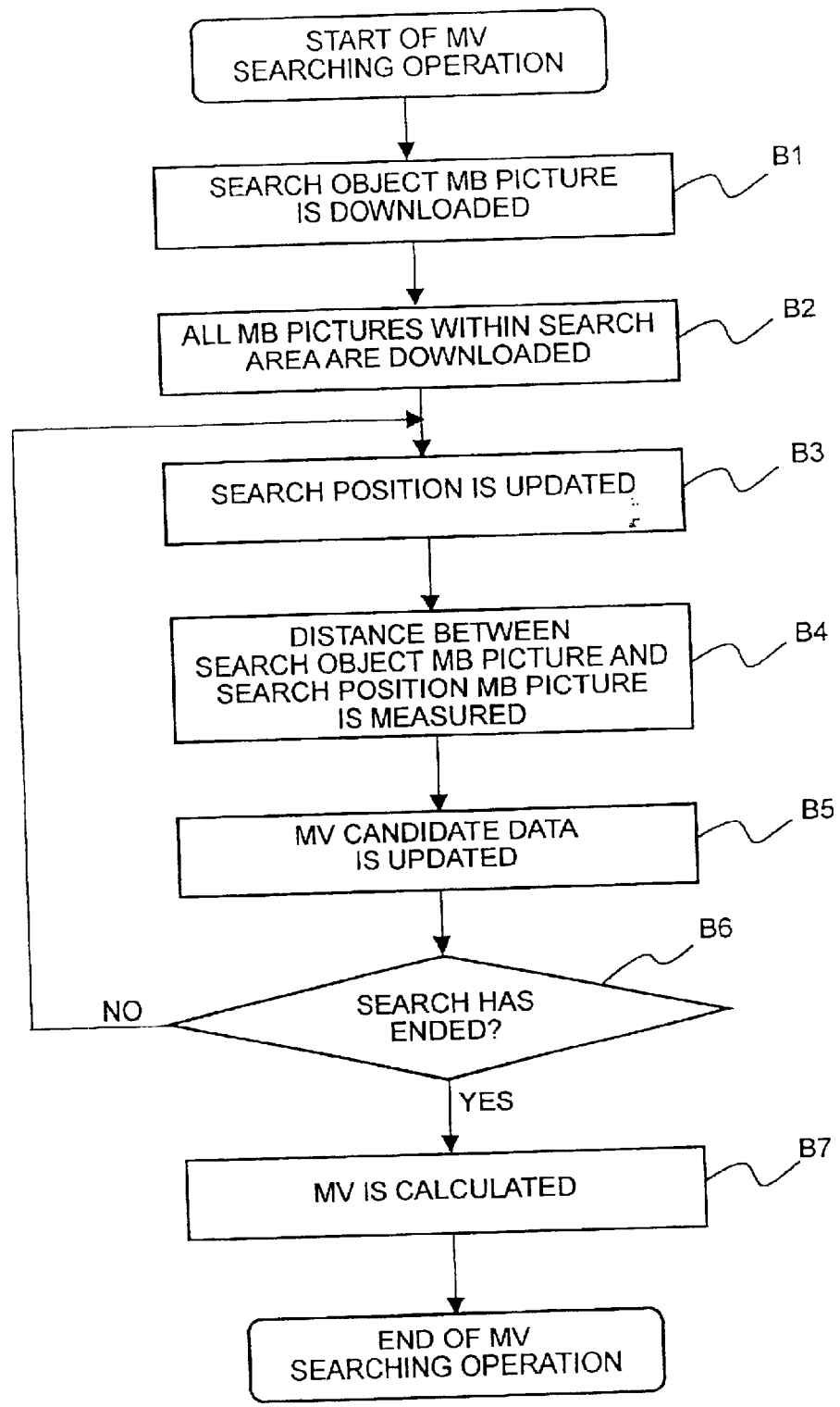
FIG. 2 is a flow chart for describing an operation of the motion vector searching device illustrated in FIG. 1.

Now, description will be made of embodiments of this invention with reference to the drawing.

Figure 3:
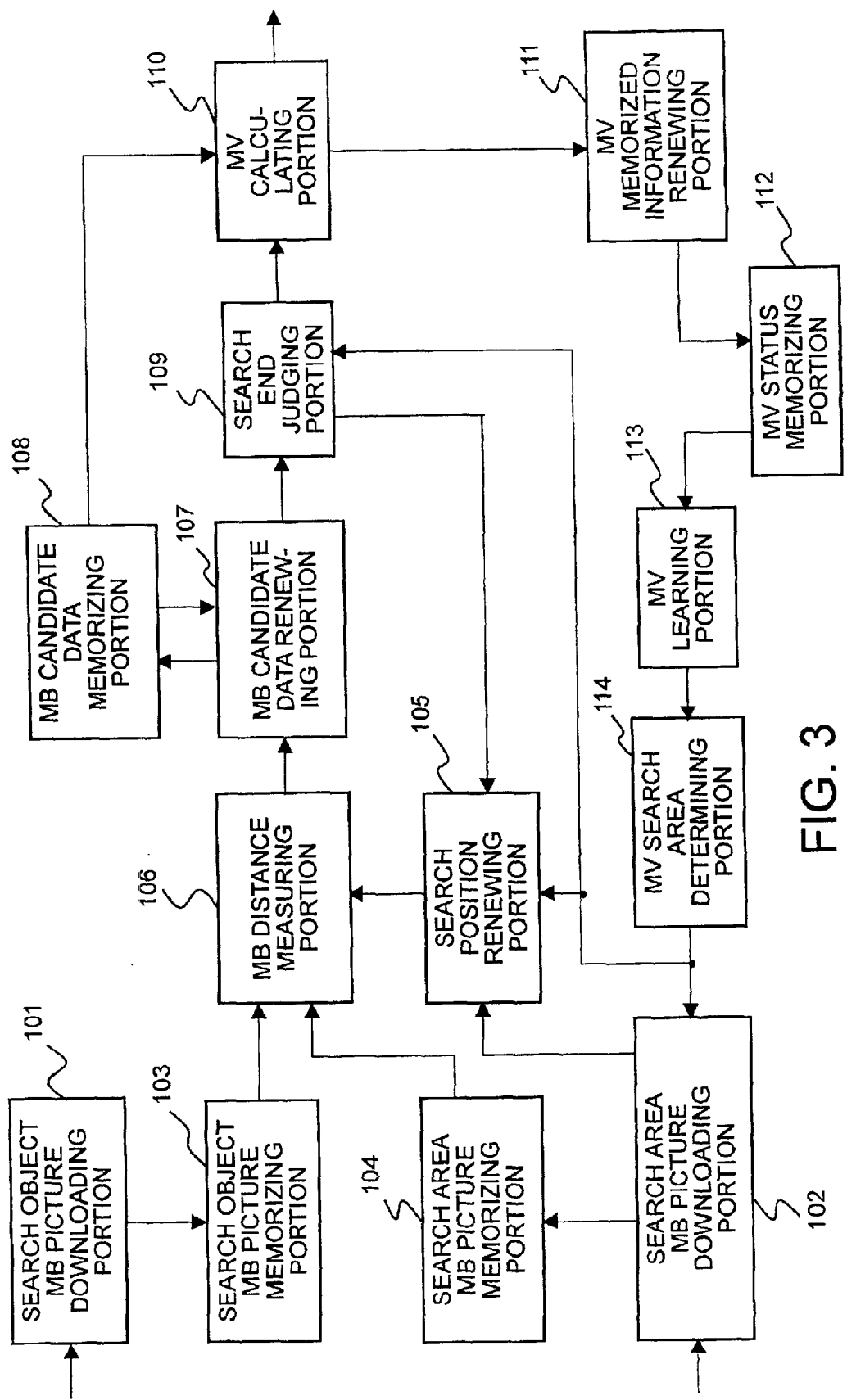
FIG. 3 is a block diagram of a motion vector searching device according to a first embodiment of this invention.
Figure 4:
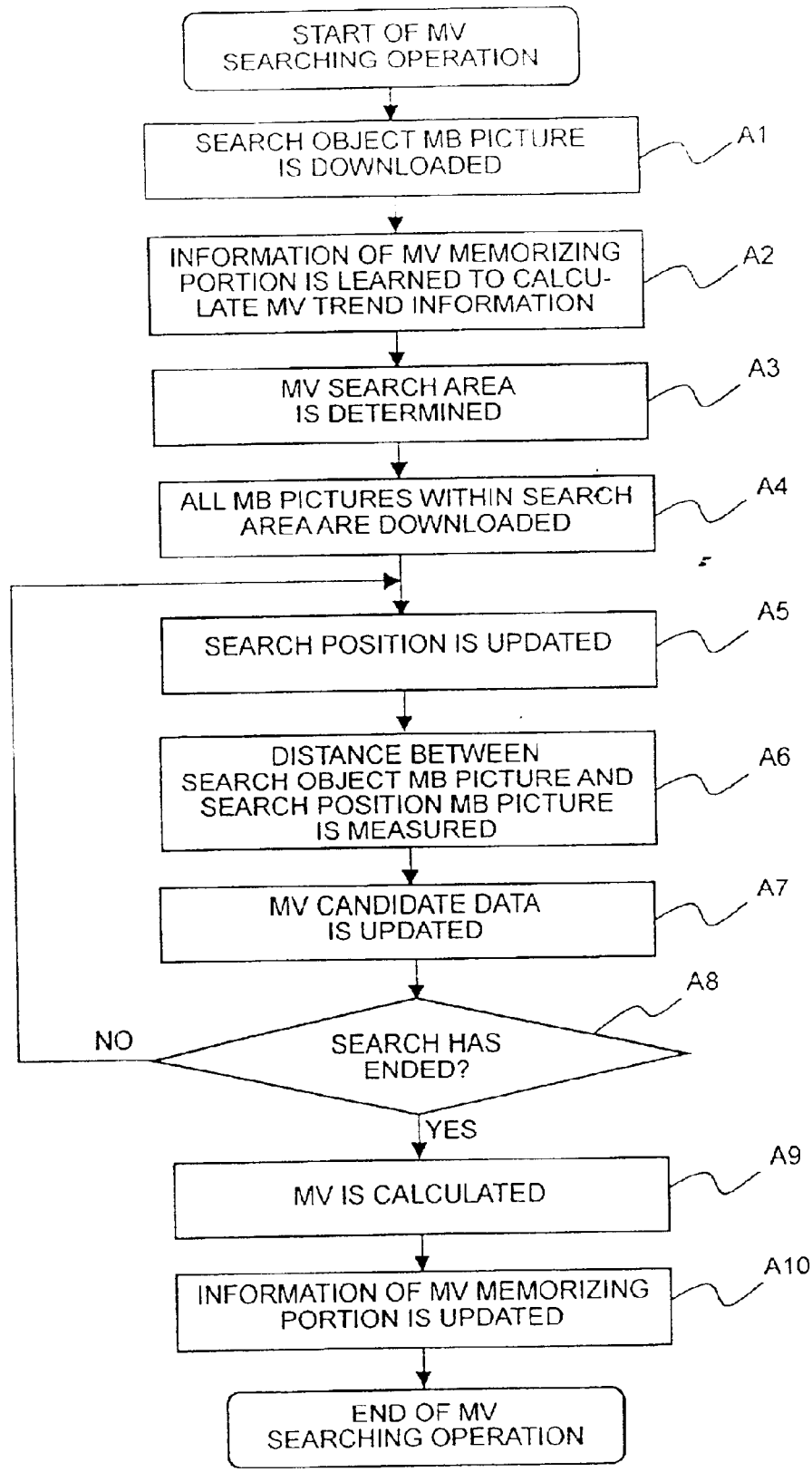
FIG. 4 is a flow chart for describing an operation of the motion vector searching device illustrated in FIG. 3.

Referring to FIGS. 3 and 4, a motion vector searching device according to a first embodiment of this invention will be described.

At first, this embodiment will be described in general.

Referring to FIG. 3, the motion vector searching device includes a motion vector searching portion (101–110) supplied with an input picture signal representative of a succession of pictures. The motion vector searching portion (101–110) is for dividing each of the pictures of the input picture signal into macro-blocks (MB's) and for searching for a motion vector (MV) as a searched motion vector for each of the blocks of each of the pictures in a search area of the input picture signal for each of the blocks of each of the pictures.

The motion vector searching device further includes an MV status memorizing portion 112, an MV learning portion 113, and an MV search area determining portion 114. The MV status memorizing portion 112 memorizes the searched motion vectors for previous pictures previous to a current picture of the pictures of the input picture signal. The MV learning portion 113 learns tendencies of the searched motion vectors for previous pictures to produce tendency information representative of the tendencies, The MV search area determining portion 114 determines the search area for each of the blocks of the current picture on the basis of the tendency information to cause the motion vector searching portion to search for the motion vector as the searched motion vector for each of the blocks of the current picture in the search area for each of the blocks of the current picture.

More specifically, the MV learning portion 113 learns the tendencies of the searched motion vectors for the previous pictures by detecting horizontal and vertical components of the searched motion vectors for the previous pictures. The MV learning portion produces the tendency information representative of the horizontal and the vertical components of the searched motion vectors for the previous pictures as the tendencies.

In this case, the MV search area determining portion 114 determines the search area on the basis of the horizontal and the vertical components of the searched motion vectors for the previous pictures which components are represented by the tendency information.

Thus, according to this embodiment, a processing amount required in an MV searching operation is considerably reduced by learning the tendencies of the searched motion vectors for the previous pictures, predicting current tendencies of the motion vectors for the current picture to determine the search areas essential and sufficient for motion vector search, and carrying out the motion vector searching operation only within the search area essential and sufficient for the motion vector search.

Next, this embodiment will be described in detail.

Referring to FIG. 3, the motion vector searching device according to this embodiment comprises a search object MB picture downloading portion 101, a search area MB picture downloading portion 102, a search object MB picture memorizing portion 103, a search area MB picture memorizing portion 104, a search position updating portion 105, an MB distance measuring portion 106, an MV candidate data updating portion 107, an MV candidate data memorizing portion 108, a search end judging portion 109, an MV calculating portion 110, an MV memorized information updating portion 111, the MV memorizing portion 112, the MV learning portion 113, and the MV search area determining portion 114.

Each of the abovementioned portions has a function which will presently be described.

The search object MB picture downloading portion 101 is supplied with an MB picture (hereinafter called a search object MB picture) to be subjected to the MV search and makes the picture be stored in the search object MB picture memorizing portion 103.

The search area MB picture downloading portion 102 is supplied from the MV search area determining portion 114 with information of the MV search area representative of a area over which the MV is actually searched with respect to the search object MB picture, acquires all MB pictures within the MV search area, and makes these pictures be stored in the search area MB picture memorizing portion 104. After completion of this storing operation, the search area MB picture downloading portion 102 supplies the search position updating portion 105 with a download end signal representing that all MB pictures within the MV search area have been downloaded to the search area MB picture memorizing portion 104.

The search object MB picture memorizing portion 103 stores the search object MB picture.

The search area MB picture memorizing portion 104 stores all MB pictures within the MV search area.

The search position updating portion 105 is supplied with the information of the MV search area from the MV search area determining portion 114 and, upon reception of the download end signal or upon reception of a search position updating request signal requesting updating of a search position from the search end judging portion 109, updates the search position within the MV search area, and delivers search position information representative of an updated search position to the MB distance measuring portion 106.

The MB distance measuring portion 106 is supplied with the search object MB picture from the search object MB picture memorizing portion 103 and with an MB picture (hereinafter called a search position MB picture) selected among all MB pictures stored in the search area MB picture memorizing portion 104 in correspondence to the search position supplied from the search position updating portion 105. The MB distance measuring portion 106 measures as a measured distance a distance between the search object MB picture and the search position MB picture and delivers the measured distance and the search position information to the MB candidate data updating portion 107.

The MV candidate data updating portion 107 is supplied with the information of a minimum distance stored in the MV candidate data memorizing portion 108 and compares the minimum distance with the measured distance supplied from the MB distance measuring portion 106. If the measured distance is smaller than the minimum distance, the measured distance and the search position information are stored in the MV candidate data memorizing portion 108 as a new minimum distance and new search position information corresponding to the new minimum distance. On the other hand, if the measured distance is greater than the minimum distance, the information stored in the MV candidate data memorizing portion 108 is not updated. Thereafter, the MV candidate data updating portion 107 supplies the search end judging portion 109 with a position search end signal representing that a searching operation at the search position has ended.

The MV candidate data memorizing portion 108 stores as MV candidate data the information of the minimum distance and the search position information corresponding to the minimum distance which are supplied from the MV candidate data updating portion 107.

In response to the position search end signal from the MV candidate data updating portion 107, the search end judging portion 109 judges whether or not the search has ended for all search positions within the MV search area supplied from the MV search area determining portion 114. If the result of judgment indicates that the search for all search positions within the MV search area has not ended yet, the search end judging portion 109 delivers the search position updating request signal to the search position updating portion 105. On the other hand, if the search has ended for all search positions within the MV search area, the search end judging portion 109 supplies the MV calculating portion 110 with a area search end signal representative of completion of the search for all search positions within the MV search area.

In response to the area search end signal from the search end judging portion 109, the MV calculating portion 110 acquires the information of the search position stored in the MV candidate data memorizing portion 108 and delivers the information as MV information to the outside and to the MV memorized information updating portion 111.

The MV memorized information updating portion 111 is supplied with the MV information from the MV calculating portion 110 and makes the information be stored in the MV memorizing portion 112 as the MV information for each MB contained in the search object MB picture.

The MV memorizing portion 112 stores the MV information related to each MB in the input picture for a plurality of time instants. Specifically, the information representing past or future positions at which all MB's in a particular picture are located in a past or a future picture is stored with respect to a plurality of pictures at a plurality of time instants.

The MV learning portion 113 obtains and learns the MV information related to each MB in the previous pictures and stored in the MV memorizing portion 112, calculates tendency information for the MV (hereinafter called MV tendency information), and delivers the tendency information to the MV search area determining portion 114.

The MV search area determining portion 114 determines the MV search area with reference to the MV tendency information supplied from the MV learning portion 113, and delivers the search area to the search area MB picture downloading portion 102, the search position updating portion 105, and the search end judging portion 109.

Next referring to FIG. 4, an operation of the motion vector searching device of this embodiment will be described.

For example, the motion vector searching device of the type is used in the following case. Specifically, it is used in a moving picture encoding device for compressing a data amount of a moving picture signal for storage or transmission and in order to compress the data amount of a moving picture by dividing an input moving picture into a plurality of MBs, searching for each MB the MV with respect to the past or the future picture, and removing a temporal redundancy of the moving picture by the use of the MV information.

Referring to FIG. 4, the search object MB picture downloading portion 101 is supplied with the search object MB picture to be subjected to the MV search and makes the picture be stored in the search object MB picture memorizing portion 103 (step A1).

The MV memorizing portion 112 stores the MV information related to each MB in the input picture with respect to a plurality of pictures at a plurality of time instants in the past. Specifically, the information representative of past positions at which all MB's in a particular picture are located in the past picture is stored for a plurality of pictures at a plurality of time instants. Hereinafter, a set of the MV information related to a first picture, a set of the MV information related to a second picture, a set of the MV information related to a third picture, . . . , a set of the MV information related to an n-th picture will be referred to as a first MV information group, a second MV information group, a third MV information group, . . . an n-th MV information group, respectively. Thus, if the MV information related to a MB at a desired position is looked up in the first MV information group, it is possible to obtain the information of the position at which the MB at the desired position in the first picture is located in the second picture.

The MV learning portion 113 acquires and learns the MV information related to each MB in a plurality of past pictures and stored in the MV memorizing portion 112, calculates the MV tendency information, and delivers the tendency information to the MV search area determining portion 114 (step A2).

Hereinafter, description will be made of one example of the learning operation mentioned above.

At first, among the picture elements contained in the search object MB, a desired picture element (hereinafter called a selected picture element) is selected. Next, the MV information related to the selected picture element is looked up in the first MV information group and the position of the selected picture element in the second picture is calculated. Likewise, the MV information related to the selected picture element is looked up in the second MV information group and the position of the selected picture element in the third picture is calculated. Likewise, the third MV information group, the fourth MV information group, and so on are successively looked up. Thus, calculation is made of the information of the positions where the selected picture element is present in the first, the second, the third, . . . , and the n-th pictures.

By successively looking up the MV information of the selected picture element in the abovementioned manner, it is possible to know the tendency of movement of the selected picture element. The MV learning portion 113 delivers the tendency of movement of the selected picture element to the MV search area determining portion 114 as the MV tendency information.

Herein, let (x, y) represent the MV information when a particular picture element moves over distances x and y in the horizontal and the vertical directions, respectively, It is assumed that a particular selected picture element moves with both horizontal and vertical components kept at some positive values, for example, (3, 3)→(3, 4)→(4, 4)→(4,3). In this event, it is predicted that the particular selected picture element will highly possibly move in positive directions with respect to both the horizontal and the vertical components also in a next input picture. Then, in this case, the information "the horizontal and the vertical components will highly possibly be in the positive directions" is produced as the MV tendency information. If another selected picture element exhibits a past movement such as (3, 3)→(3, 0)→(−2, −5)→(−4,3), it is recognized that no obvious tendency exists. Then, the information "no obvious tendency is observed as the tendency of movement of the MV" is produced.

The learning operation in the step A2 may be performed for a single desired picture element alone or a plurality of picture elements among the picture elements contained in the search object MB. In the latter case, a final result of learning is obtained by combining a plurality of results of learning for those picture elements.

Next, the MV search area determining portion 114 is supplied with the MV tendency information from the MV learning portion 113, determines the MV search area, and delivers the information of the MV search area to the search area MB picture downloading portion 102, the search position updating portion 105, and the search end judging portion 109 (step A3).

The above-mentioned determination is carried out in the following manner. For example, if the MV tendency information is the information "the horizontal and the vertical components will highly possibly be in the positive directions", it is predicted that the search object MB containing the selected picture element in consideration will move, this time also, in positive directions both in the horizontal and the vertical directions. Therefore, in a next search, the MV search area for the search object MB is restricted to an area extending from the current position of the search object MB in the positive directions both in the horizontal and the vertical directions. On the other hand, if the MV tendency information is the information "no obvious tendency is observed as the tendency of the MV", it is impossible to predict the direction of movement of the search object MB containing the selected picture element in consideration. Therefore, the MV search area is not particularly restricted but is equivalent to a search area in the related motion vector searching device in FIG. 1.

Figure 5:
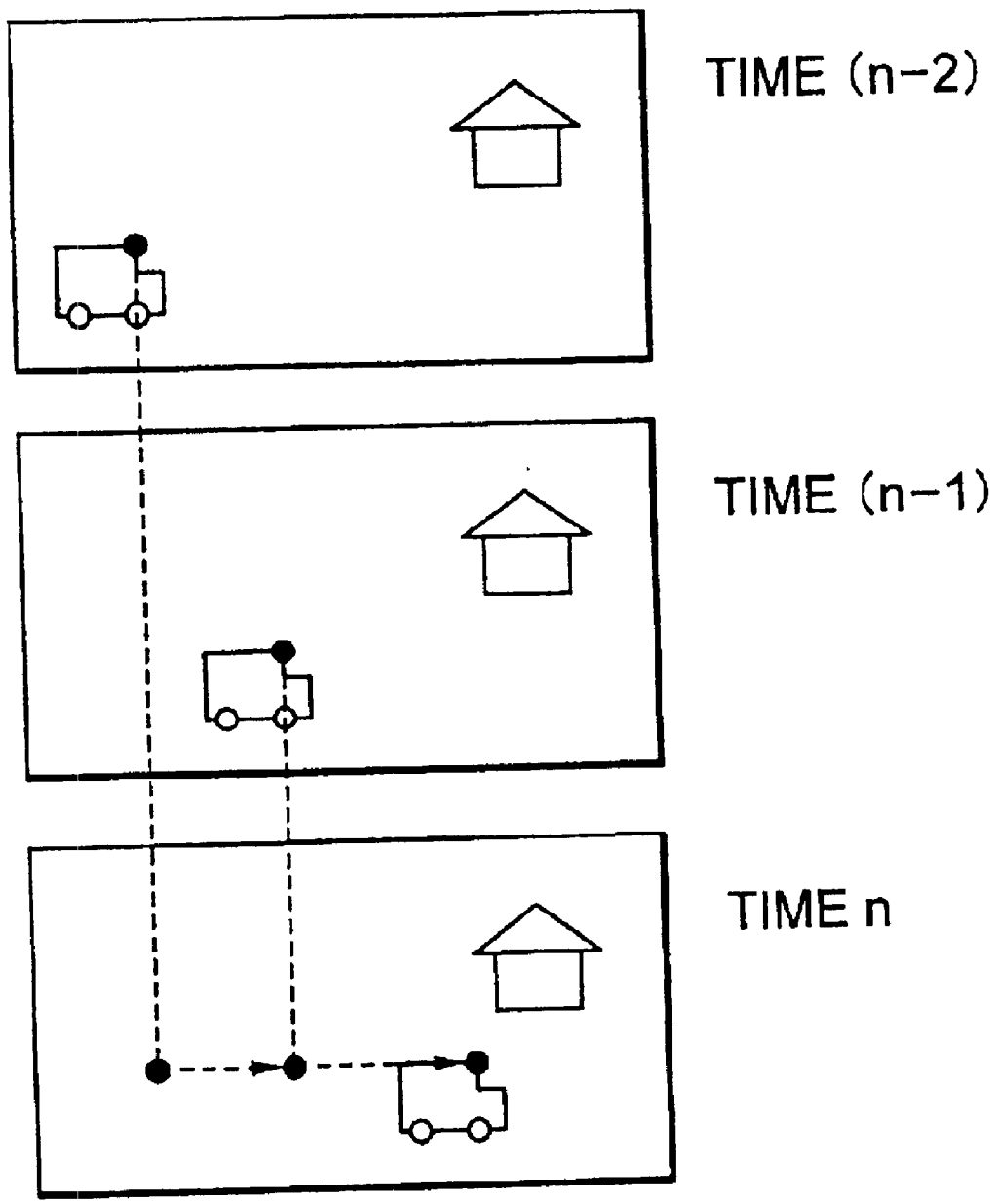
FIG. 5 is a diagram for describing an operation of the motion vector searching device illustrated in FIG. 3.
Figure 6:
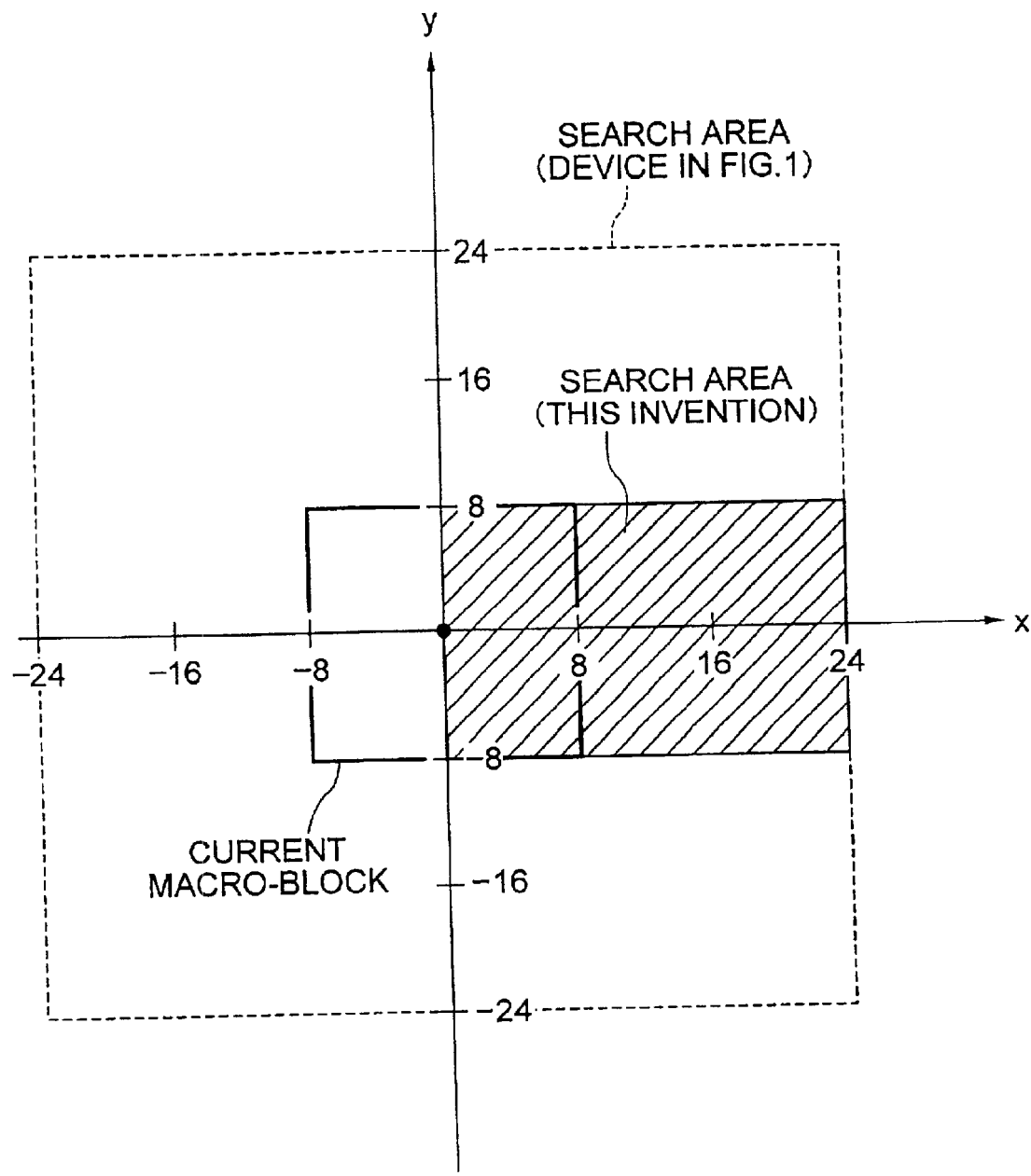
FIG. 6 is another diagram for describing an operation of the motion vector searching device illustrated in FIG. 3.

Referring to FIG. 5, a car moves rightward in the previous pictures (see time (n-2) and time (n−1) and in the current picture (see time n). Inasmuch as the car moves towards a positive direction along the x axis (y=0) in this case, the search area for a current macro-block of the current picture is restricted to the hatched area illustrated in FIG. 6. In FIG. 6, the hatched search area of this invention is smaller than the search area in the related motion vector searching device in FIG. 1 which is shown by the broken line in FIG. 6.

Turning back to FIG. 4, the search area MB picture downloading portion 102 is supplied from the MV search area determining portion 114 with the information of the MV search area (for example, a area covering 48×48 picture elements in the horizontal and vertical directions) for the search object MB, acquires all MB pictures within the MV search area, and makes these pictures be stored in the search area MB picture memorizing portion 104. After completion of this storing operation, the search area MB picture downloading portion 102 delivers the download end signal to the search position updating portion 105 (step A4).

The search position updating portion 105 receives the information of the MV search area from the MV search area determining portion 114. Upon reception of the download end signal or upon reception of the search position updating request signal from the search end judging portion 109, the search position updating portion 105 updates the search position within the MV search area and delivers the search position information to the MB distance measuring portion 106 (step A5).

The MB distance measuring portion 106 is supplied with the search object MB picture from the search object MB picture memorizing portion 103 and with the search position MB picture among all the MB pictures stored in the search area MB picture memorizing portion 104. Then, the MB distance measuring portion 106 measures as a measured distance a distance between the search object MB picture and the search position MB picture and delivers the measured distance and the search position information to the MV candidate data updating portion 107. As a practical method of measuring the distance, use may be made of, for example, a method of calculating a sum of a square of differences for all picture elements in the MB (step A6).

The MV candidate data updating portion 107 is supplied with the information of the minimum distance stored in the MV candidate data memorizing portion 108 and compares the minimum distance with the measured distance supplied from the MB distance measuring portion 106. If the measured distance is smaller than the minimum distance, the MV candidate data updating portion 107 makes the measured distance and the search position information be stored in the MV candidate data memorizing portion 108 as a new minimum distance and new search position information corresponding to the new minimum distance. On the other hand, if the measured distance is greater than the minimum distance, the information stored in the MV candidate data memorizing portion 108 is not updated. Thereafter, the MV candidate data updating portion 107 delivers a position search end signal to the search end judging portion 109 (step A7).

In response to the position search end signal, the search end judging portion 109 judges whether or not the search has ended for all search positions within the MV search area supplied from the MV search area determining portion 114. For example, assuming that the MV search area for a particular MB covers 48×48 picture elements in the horizontal and the vertical directions, the search positions are equal in number to 48×48=2304. In this event, judgment is made about whether or not the search has been performed 256 times.

If the result of judgment indicates that the search for all search positions within the MV search area has not yet ended, the search end judging portion 109 delivers the search position updating request signal to the search position updating portion 105. On the other hand, if the result of judgment indicates that the search for all search positions within the MV search area has ended, the search end judging portion 109 delivers the area search end signal to the MV calculating portion 110 (step A8).

Subsequently, the steps A5, A6, A7, and A8 are repeated until the area search end signal is delivered from the search end judging portion 109 to the MV calculating portion 110.

Supplied from the search end judging portion 109 with the area search end signal, the MV calculating portion 110 acquires the search position information stored in the MV candidate data memorizing portion 108 and delivers the search position information as the MV information to the outside and to the MV memorized information updating portion 111. It is noted that the MV information is defined as follows. For example, if a particular picture element moves over distances 3 and 4 in the horizontal and the vertical directions, respectively, the MV information is given by (3,4). Then, the MV calculating portion 110 delivers the MV information (3, ) to the outside and the MV memorized information updating portion 111 (step A9).

The MV memorized information updating portion 111 makes the MV information supplied from the MV calculating portion 110 be stored in the MV memorizing portion 112 as the MV information for the picture elements contained in the search object MB picture. For example, it is assumed that the MV information for a particular MB is (3,4). This means that the picture element contained in the MB moves over the distances 3 and 4 in the horizontal and the vertical directions, respectively. Therefore, the MV information (3,4) for all picture elements contained in the MB is stored as the information of the first MV information group. After all the information of the first MV information group is stored, the information group is updated. Specifically, the information of the n-th MV information group is deleted. The information of the (n−1)-th MV information group is copied to the n-th MV information group, the information of the (n−2)-th MV information group is copied to the (n−1)-th MV information group, . . . , the information of the first MV information group is copied to the second MV information group (step A10).

Figure 7:
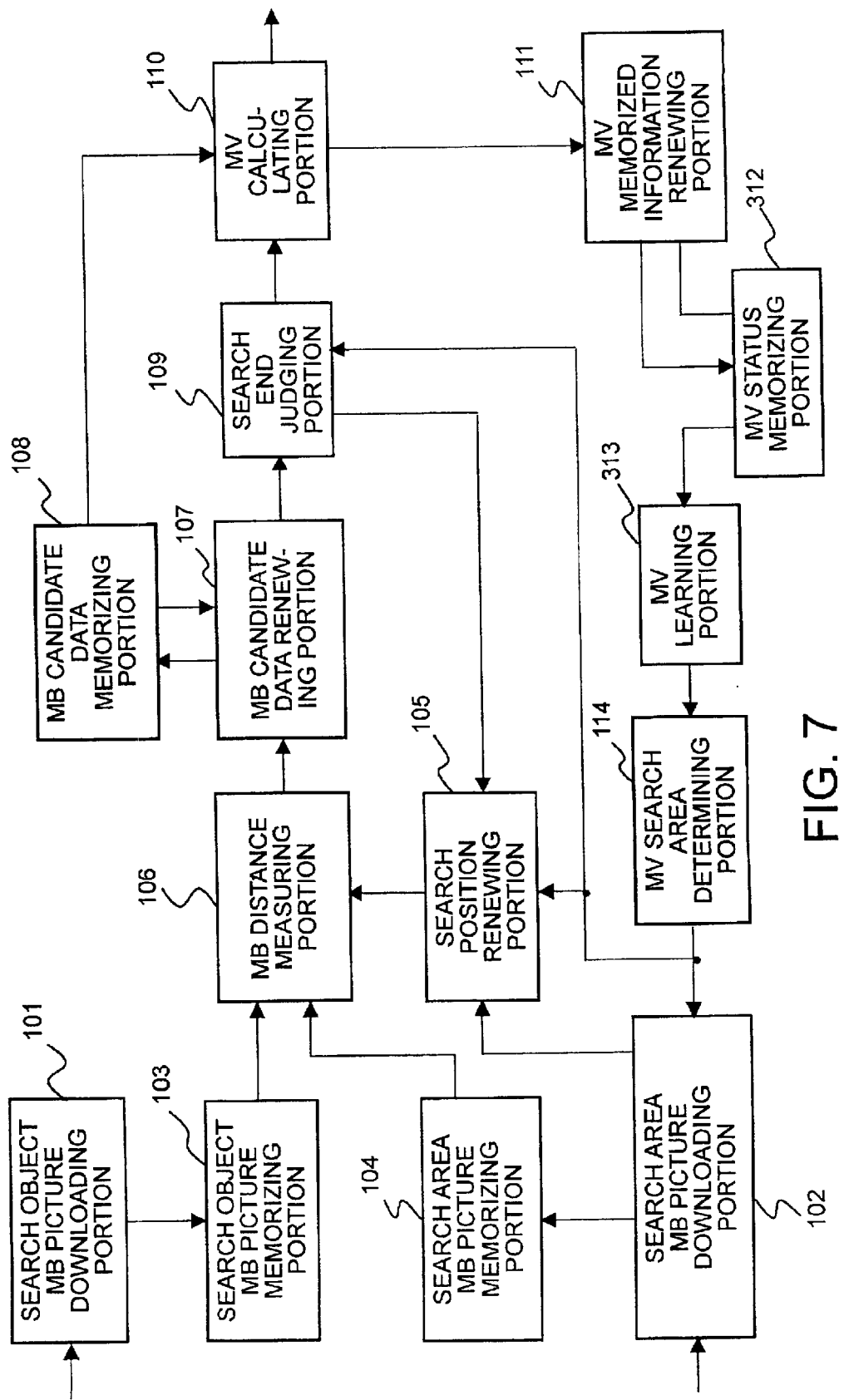
FIG. 7 is a block diagram of a motion vector searching device according to a second embodiment of this invention.
Figure 8:
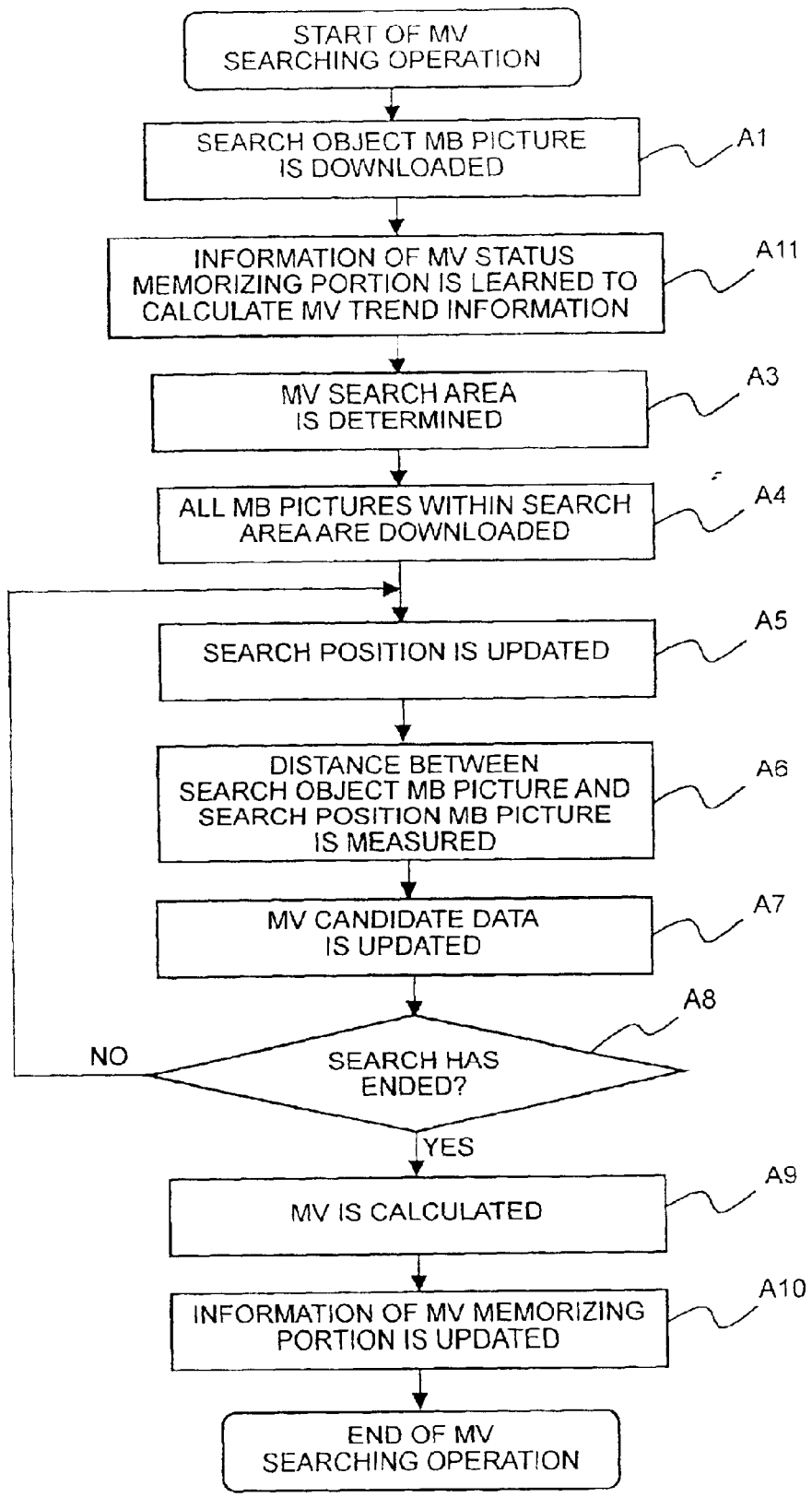
FIG. 8 is a flow chart for describing an operation of the motion vector searching device illustrated in FIG. 7.

Referring to FIGS. 7 and 8, description will be made of a motion vector searching device according to a second embodiment of this invention. Similar parts are designated by like reference numerals and repetitive description will be omitted.

Referring to FIG. 7, this embodiment is different in structure from the first embodiment in that the MV memorizing portion 112 in FIG. 3 is replaced by an MV status memorizing portion 312 and that the MV learning portion 113 in FIG. 3 is replaced by an MV learning portion 313.

As compared with the MV memorizing portion 112 in FIG. 3, the MV status memorizing portion 312 is different in mode of memorizing the information related to the MV. Specifically, the MV status memorizing portion 312 stores the status (hereinafter called an MV movement status) how each picture element in the input picture moves from a past or a future picture.

For example, it is assumed that a desired picture element has moved with both horizontal and vertical components kept at some positive values as shown by past transition of the MV information (3, 3)→(3, 4)→(4, 4)→(4,3). In this event, the MV movement status of the desired picture element can be represented by (positive in horizontal, positive in vertical, 3) by way of example. Thus, the status of the past movement of the picture element "the movement in the positive direction in the horizontal direction and in the positive direction in the vertical direction has been performed three times in succession" is known from the MV movement status. Therefore, in this embodiment, the MV information related to each picture element in the input picture need not be stored for a plurality of past or future time instants but the information of a single set is required to be stored.

As compared with the MV learning portion 113, the MV learning portion 313 is different in operation of learning the MV information. The difference in operation will be described in the following.

Referring to FIG. 8, an operation of this embodiment will be described. Similar steps are designated by like step numbers and repetitive description will be omitted.

Referring to FIG. 8, difference from the first embodiment resides in that the operation of learning the information of the MV memorizing portion 112 as depicted by the step A2 in FIG. 4 is replaced by an operation of learning the information of the MV status memorizing portion 312 as depicted by a step A11 and that the operation of updating the information of the MV memorizing portion 112 as depicted by the step A10 in FIG. 4 is replaced by an operation of updating the information of the MV status memorizing portion 312 as depicted by a step A12.

Now, description will be made of the operations in the steps A11 and A12 in FIG. 8.

At first, the operation in the step A12 will be described.

The MV memorized information updating portion 111 is supplied from the MV status memorizing portion 312 with the MV status information. By the use of the MV information supplied from the MV calculating portion 110, the MV memorized information updating portion 111 updates the MV status information supplied from the MV status memorizing portion 312 and makes new MV status information after updating be stored in the MV status memorizing portion 312.

For example, it is assumed that the MV memorized information updating portion 111 is supplied from the MV status memorizing portion 312 with the MV status information (positive in horizontal, positive in vertical, 3) as the MV status information related to a particular picture element. This represents the status where "the movement in the positive direction in the horizontal direction and in the positive direction in the vertical direction has been performed three times in succession". In this case, it is assumed that the MV memorized information updating portion 111 is newly supplied from the MV calculating portion 110 with the MV information (4, 5). In this event, the MV status information is updated into the information "the movement in the positive direction in the horizontal direction and in the positive direction in the vertical direction has been performed four times in succession", i.e., the information (positive in horizontal, positive in vertical, 4). The updated information is stored in the MV status memorizing portion 312 (step A12).

The MV learning portion 313 acquires the MV status information related to each picture element in a past or a future picture and stored in the MV status memorizing portion 312, learns the MV status information, calculates the MV tendency information, and delivers the MV tendency information to the MV search area determining portion 114.

Hereinafter, description will be made of one example of the learning operation in this embodiment.

At first, among the picture elements contained in the search object MB, a desired picture element (hereinafter called a selected picture element) is selected. Next, the MV status information related to the selected picture element is looked up to know how the selected picture element moves from a past or a future picture. Thus, by looking up the MV status information, it is possible to know the tendency of movement of the selected picture element. For example, it is assumed that the MV status information corresponding to a particular picture element is the information (positive in horizontal, positive in vertical, 4). In this event, it is predicted that the selected picture element will highly possibly move next time also in the positive directions with respect to both the horizontal and the vertical components. Therefore, in this case, the MV learning portion 313 delivers to the MV search area determining portion 114 the information "the horizontal and the vertical components will highly possibly be in the positive directions" as the MV tendency information.

The leaning operation in the step A12 may be performed for a single desired picture element alone or a plurality of picture elements among the picture elements contained in the search object MB. In the latter case, a final result of learning is obtained by combining a plurality of results of learning for those picture elements.

The motion vector search device in FIG. 3 or 5 may be implemented by a computer system. In this event, a storage medium. such as an ROM, used in the computer system to memorize a program executed by a CPU comprises a storage medium recording a program according to this invention. Specifically, the storage medium memorizes the program for executing the operation according to the flow chart in FIG. 4 or 6. As the storage medium, use may be made of a semiconductor memory, an optical disk, a magnetooptical disk, a magnetic recording medium, and the like.

As a first effect, it is possible to restrict the search area in the MV searching operation in moving picture encoding. This is because the direction of future movement of the picture element can be predicted by learning the tendency of past movement of the picture element.

As a second effect, it is possible to considerably reduce the processing amount required in the motion vector searching operation in moving picture encoding. This is because the calculation amount in the searching operation is proportional to the search area so that, by restricting the search area according to the first effect, the processing amount required in the search can be reduced.

What is claimed is:

1. A motion vector searching device which includes a motion vector searching portion supplied with an input picture signal representative of a succession of pictures for dividing each of said pictures of said input picture signal into blocks, and for searching for a motion vector as a searched motion vector for each of the blocks of each of said pictures in a search area of said input picture signal for each of the blocks of each of said pictures, said motion vector searching device comprising:

a learning portion for learning tendencies of the searched motion vectors for previous pictures to a current picture of the pictures of said input picture signal to produce tendency information representative of said tendencies; and a determining portion for determining the search area for each of the blocks of said current picture on the basis of said tendency information to cause said motion vector searching portion to search for the motion vector as the searched motion vector for each of the blocks of said current picture in the search area for each of the blocks of said current picture.

2. A motion vector searching device as claimed in claim 1, wherein said learning portion learns the tendencies of the searched motion vectors for said previous pictures by detecting horizontal and vertical components of the searched motion vectors for said previous pictures, said learning portion producing the tendency information representative of the horizontal and the vertical components of the searched motion vectors for said previous pictures as said tendencies.

3. A motion vector searching device as claimed in claim 2, wherein said determining portion determines the search area on the basis of the horizontal and the vertical components of the searched motion vectors for said previous pictures which components are represented by said tendency information.

4. A motion vector searching method which includes a motion vector searching step, supplied with an input picture signal representative of a succession of pictures, of dividing each of said pictures of said input picture signal into blocks and of searching for a motion vector as a searched motion vector for each of the blocks of each of said pictures in a search area of said input picture signal for each of the blocks of each of said pictures, said motion vector searching method comprising:

a learning step of learning tendencies of the searched motion vectors for previous pictures to a current picture of the pictures of said input picture signal to produce tendency information representative of said tendencies; and a determining step of determining the search area for each of the blocks of said current picture on the basis of said tendency information to cause said motion vector searching step to search for the motion vector as the searched motion vector for each of the blocks of said current picture in the search area for each of the blocks of said current picture.

5. A motion vector searching method as claimed in claim 4, wherein said learning step learns the tendencies of the searched motion vectors for said previous pictures by detecting horizontal and vertical components of the searched motion vectors for said previous pictures, said learning step producing the tendency information representative of the horizontal and the vertical components of the searched motion vectors for said previous pictures as said tendencies.

6. A motion vector searching method as claimed in claim 5, wherein said determining step determines the search area on the basis of the horizontal and the vertical components of the searched motion vectors for said previous pictures which components are represented by said tendency information.

7. A recording medium recording a program for executing:

a motion vector searching operation, supplied with an input picture signal representative of a succession of pictures, of dividing each of said pictures of said input picture signal into blocks and of searching for a motion vector as a searched motion vector for each of the blocks of each of said pictures in a search area of said input picture signal for each of the blocks of each of said pictures;

a learning operation of learning tendencies of the searched motion vectors for previous pictures to a current picture of the pictures of said input picture signal to produce tendency information representative of said tendencies; and a determining operation of determining the search area for each of the blocks of said current picture on the basis of said tendency information to cause said motion vector searching operation to search for the motion vector as the searched motion vector for each of the blocks of said current picture in the search area for each of the blocks of said current picture.

* * * * *

UNITED STATES PATENT AND TRADEMARK OFFICE
CERTIFICATE OF CORRECTION

PATENT NO. : 6,888,890 B2
APPLICATION NO. : 09/818859
DATED : May 3, 2005
INVENTOR(S) : Mayumi Nagasaki Page 1 of 1

It is certified that error appears in the above-identified patent and that said Letters Patent is hereby corrected as shown below:

Column 10,
Line 7, after "3,", insert --4--.

Signed and Sealed this

Thirtieth Day of January, 2007

JON W. DUDAS
*Director of the United States Patent and Trademark Office*